United States Patent [19]
Dankel

[11] 3,943,729
[45] Mar. 16, 1976

[54] FRICTION CLUTCH FOR POWER DRIVEN ELEMENT SUCH AS A ROTARY BLADE

[75] Inventor: Douglas D. Dankel, Kankakee, Ill.

[73] Assignee: Roper Corporation, Kankakee, Ill.

[22] Filed: Oct. 1, 1974

[21] Appl. No.: 511,018

Related U.S. Application Data

[62] Division of Ser. No. 393,825, Sept. 4, 1973, Pat. No. 3,857,521.

[52] U.S. Cl. ............... 64/30 C; 64/29; 192/109 A; 64/30 D
[51] Int. Cl.² ............................................. F16D 7/02
[58] Field of Search .......... 64/30 C, 30 D, 30 R, 29; 192/109 A, 109 B, 89 B

[56] References Cited
UNITED STATES PATENTS

| | | | |
|---|---|---|---|
| 2,862,376 | 12/1958 | Thelander | 64/30 R |
| 3,091,951 | 6/1963 | Onyskin | 64/30 R |
| 3,157,978 | 11/1964 | McMullen | 64/30 R |
| 3,832,908 | 9/1974 | Brewster | 64/30 R |

FOREIGN PATENTS OR APPLICATIONS
572,715 10/1945 United Kingdom ..................... 64/30

Primary Examiner—Samuel Scott
Assistant Examiner—Randall Heald
Attorney, Agent, or Firm—Wolfe, Hubbard, Leydig, Voit & Osann, Ltd.

[57] ABSTRACT

A friction clutch for a power driven element such as a rotary blade in which the element is seated on a drive shaft having a flange and an adjacent thread having an associated nut. Adjacent the driven element is a washer assembly which includes a rubber washer and a Bellville washer having its concave side faced toward the rubber washer so as to develop frictional clutching force between the shaft and the power driven element as the nut is tightened, the concavity of the Bellville washer serving to confine the rubber washer against radial expansion and the rubber washer, by its confinement, serving to prevent collapse of the Bellville washer upon severe tightening of the nut.

7 Claims, 5 Drawing Figures

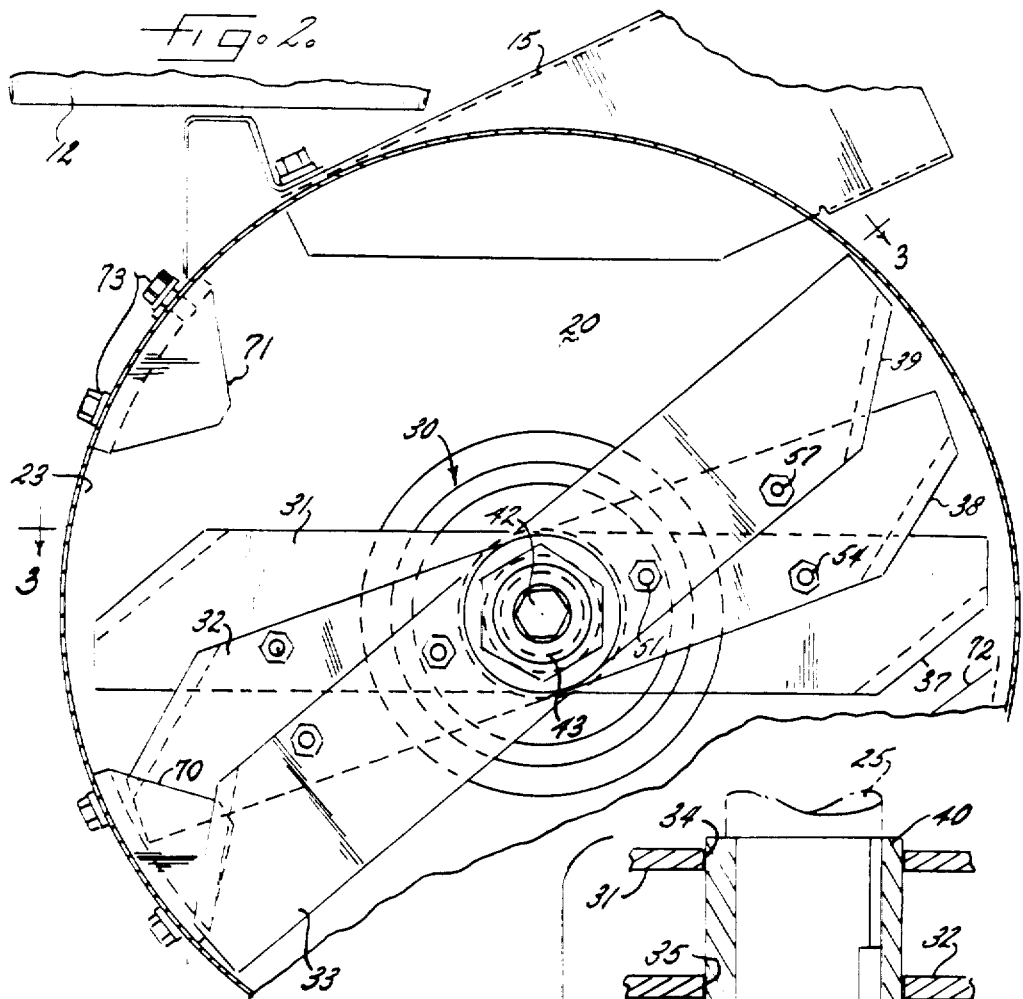
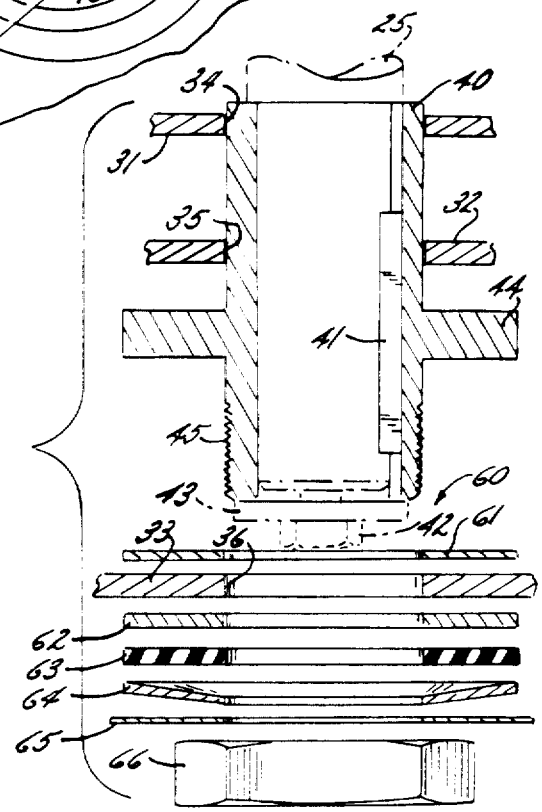

FRICTION CLUTCH FOR POWER DRIVEN ELEMENT SUCH AS A ROTARY BLADE

RELATED APPLICATIONS

Aasland et al. U.S. application Ser. No. 393,825 Filed Sept. 4, 1973 on "Shredder-Bagger Having Blade Assembly", the present application being a divisonal application thereof, now U.S. Pat. No. 3,857,521 issued Dec. 31, 1974.

It is an object of the present invention to provide a friction clutch for driving a rotary blade or the like, particularly useful for rotary blade garden implements, which makes use of a Bellville washer for developing resilient axial clutching force, but which has novel provision for preventing collapse of the Bellville washer, by flattening, upon severe or over-tightening of the associated nut.

It is a more specific object to provide an adjustable friction clutch which includes a novel combination of Bellville and rubber washers to achieve reliable and reproducible clutching as well as wide range of adjustment and development of resilient forces beyond the normal capability of a Bellville washer.

Other objects and advantages of the invention will be apparent upon reading the attached detailed description and upon reference to the drawings in which:

FIG. 2 is a horizontal section taken through the machine along the line 2—2 in FIG. 3.

FIG. 5 is an exploded view of the hub assembly of FIG. 4.

While the invention has been described in connection with a preferred embodiment, it will be understood that I do not intend to be limited to the particular embodiment shown but intend, on the contrary, to cover the various alternative and equivalent constructions included within the spirit and scope of the appended claims. 75

Figure 1:
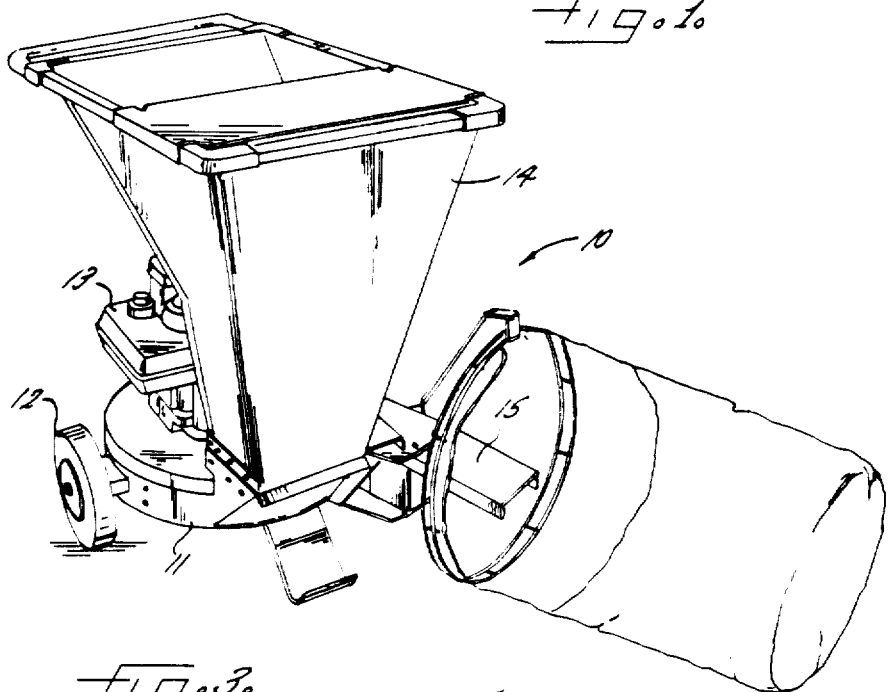
FIG. 1 is a general perspective view of a shredderbagger employing the present invention.

Turning now to FIG. 1 there is shown a shredderbagger 10 having a frame 11 supported, with respect to the ground, upon wheels 12. Superimposed upon the frame is an engine 13 and adjacent the engine is a hopper 14. Garden debris which is fed into the hopper is forcibly ejected in an air stream via a discharge chute 15 into a suitable receiving bag.

Figure 3:
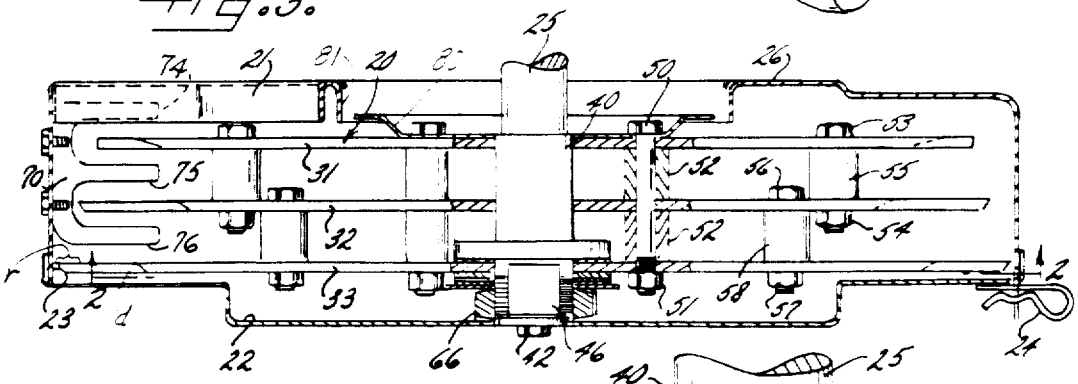
FIG. 3 is a vertical section taken along the line 3—3 in FIG. 2, developed, and with portions broken away.
Figure 4:
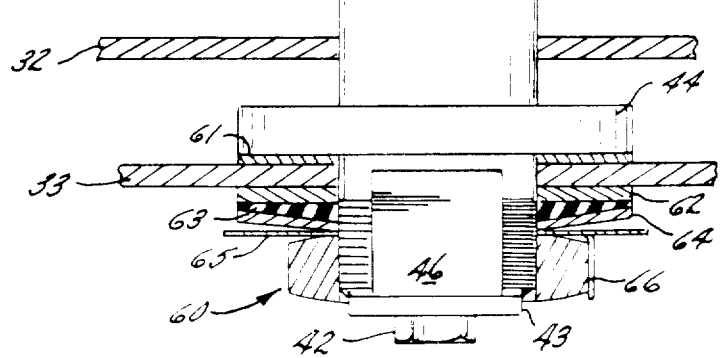
FIG. 4 is an enlarged fragmentary elevation showing the hub.

Turning next to FIGS. 2 and 3 it will be seen that the frame defines a shallow cylindrical chamber 20 having a top wall 21, a flat bottom wall 22 and a circular side wall 23. The top wall and side wall are preferably integral with one another and the bottom wall, which provides access, is held in place by clips 24. The engine shaft, indicated at 25, extends axially downward into the chamber. Material is fed from the hopper into the chamber via a receptacle 26.

In accordance with the present invention a blade assembly is provided in the shredding chamber mounted upon a hub which is keyed to the shaft and made up of a plurality of blades which are telescoped over the hub and coupled to it via a friction clutch, the blades being offset slightly but with their bodies overlapping one another and clamped together with spacers to form a rigid box-like assembly. Thus the blade assembly, indicated at 30, has, in the present instance, a top blade 31 which is in leading position, a middle blade 32 and a bottom blade 33. The blades have respective central openings 34, 35, 36 of the same diameter and sharpened tips 37, 38, 39 which are, as shown, retreatingly angled, or chamfered. The blades are telescoped over, and permanently captive upon, the hub 40 which is keyed, by a key 41, to the motor shaft 25. The hub is held upon the motor shaft by an axial screw 42 and end washer 43. Forming a part of the hub is a flange 44 having an adjacent thread 45, the hub being flatted in the region of the thread as indicated at 46.

For the purpose of securely clamping all of the blades together in the slightly offset relation, a pair of clamping bolts 50 are used, having nuts 51 and spacers 52, and with the bolts extending through the entire stack of blades. In addition, the top blade is connected to the middle blade by a pair of bolts 53 and nuts 54 and spacers 55. Finally, the middle blade is connected to the lower blade by bolts 56 having respective nuts 57 and spacers 58. The combination of the overlapping blades, plus the bolts and spacers clamping the blade bodies together, produces a box-like structure in which each blade reinforces the others to increase its effective strength in the shredding operation and in which each blade, moreover, acts to prevent flexure and vibration of the neighboring blades.

For the purpose of conveying driving torque from the hub to the blade assembly, a clutch assembly frictionally couples the lowermost blade to the flange 44 on the hub. The clutch assembly, indicated at 60, includes first and second friction washers 61, 62 which straddle the blade 33, a rubber washer 63, a Bellville type washer 64 and a lock washer 65, all of which are sandwiched tightly together against the hub flange by means of a nut 66, the flange serving as a "keyed" stationary washer. The washers 62, 65 are preferably formed with a "flatted" internal opening which registers with the flat 46 on the hub.

In accordance with one of the specific aspects of the present invention the rubber washer faces the concave side of the Bellville washer, with the result that the two act cooperatively in the resilient transmission of axial force from the nut to the clutching surfaces. Because of the concave nature of the Bellville washer the rubber washer is held captive at its periphery so that it is largely confined and prevented from spreading radially in the face of the axial force. At the same time the volumetric confinement of the rubber washer produces a reaction force having an increasing spring rate so that the rubber washer serves to prevent collapse of the Bellville washer, particularly where the latter is severely or overly tightened. As is well known, a Bellville washer is a convenient means for securing resiliency in a compressed stack, but where a Bellville washer is stressed beyond the point of yield it tends to collapse, that is, revert to a flat, non-resilient state. For this reason Bellville washers have largely been avoided in assemblies of this kind, particularly assemblies where the adjustment is at the mercy of a householder who may lack mechanical knowledge and skill. By contrast it is found that, using the rubber washer and Bellville washer in combination, the possibility of overstressing the Bellville washer by excessive tightening is largely precluded. In normal operation, and with the nut properly tightened, the Bellville washer and rubber washer, acting together develop an optimum axial clutching force with adequate and automatic take-up of any wear which might occur at the clutch faces. It is found that the present blade assembly may be left in place, without maintenance, or adjustment, almost indefinitely. Shredding largely occurs by reason of impact and it is not therefore necessary to periodically sharpen the blades, as it is in the case of a rotary mower, so that the permanence of the adjustment of clutch torque is a matter of some importance.

In carrying out the invention stationary breakers are provided on the side wall of the shredding chamber having teeth which are interdigitated with the tips of the blades, the breakers being offset upwardly from the bottom wall of the chamber and the lowermost one of the blades being extended radially beyond the companion blades into close proximity to the side wall and into close running engagement with the bottom wall.

Thus as shown in FIGS. 2 and 3, a total of three breakers are used indicated at 70, 71 and 72, held in position by mounting screws 73 and having a total of three teeth 74, 75, 76. Each breaker is mounted so that a shallow clearance space $d$ exists under the lowermost tooth 76, a space which is occupied by the tips of the blade 33, which tips are radially extended in length by a distance $r$ as compared to the tips of the other two blades. As a result of the close proximity of the blade 33 to the bottom wall and side wall, such walls are continuously swept clear of any debris of a type which would, in a conventional shredder, result in formation of a permanent hard cake of collected material, a cake which would have to be periodically cleaned out in order to maintain shredder efficiency. It is found that in the present construction the regions where a cake would normally collect are, instead, kept bright and clean, even where the shredder is used to dispose of succulent materials such as freshly cut weeds and foliage.

It is one of the still further features of the present invention that means are provided for protecting the seal which is present in engines at the point of entry of the shaft 25 into the engine housing. This is accomplished by providing, at the top of the blade assembly, a seal protecting disc 80 which is secured in place by the bolts 50. This disc 80 is, as shown in FIG. 3, of slightly dished construction, and fills a circular opening 81 in the top 21 of the shredding chamber. Rotation of the disc 80 at blade speed, by reason of centrifugal force, keeps the region of the shaft and its seal clear of debris of all kinds and particularly clear of the abrasive debris which would, in time, affect the integrity of the seal and which might cause a catastrophic loss of oil and failure of the engine.

It is found, in use, that the blade assembly not only has a greater volumetric efficiency, or "through put", in the handling of debris but that it has the ability to operate efficiently over a wide range of engine horsepower, being uniquely suited to making full use of the horsepower available in the larger sizes of engines, but using a frame which is not substantially greater in size than the frames which have been customarily employed with engines of more limited horsepower. Because of the limited offset between the blades the "blade rate", that is, the rate of passage of the blade cluster, is sufficiently low as to provide a well defined "insertion gap" during which a branch, for example, may be inserted a distance sufficient for acting upon, in quick succession, by the blades as a group, beginning with the top blade which is in leading position. This is to be contrasted with the progressive and relatively slower "nibbling" action which occurs when evenly angled blades are employed. Because the blades are integrated in a rigid box-like assembly, each blade assists, and is assisted by, all of the others in resisting bending and other forces, resulting in a structure which is strong and vibration free but in which each blade may be made of stock of relatively limited thickness resulting in a low total weight and hence sharply reduced material costs as compared to conventional multi-blade structures. Assembly is quick and easy since the bolts and spacers assure accurate spacing, parallelism, and phasing. Alinement with the breaker openings is thus assured. The blade assembly, while intended for use in a "top of line" machine is sufficiently economical as to permit its advantages to be utilized even in machines of more limited horsepower intended for sale in the "economy" market.

Because the blades, taken together, form a wide and well-defined "front", leaves and similar light debris are moved at a high and efficient rate, with relative advancement of the top blade producing a suctional effect. Also because of the offset between the blades and their mutual rigidification, it is found that a machine using the present blade assembly is capable of disposing of branches which are thicker than those which can be handled by more conventional machines. However, in the event that an obstruction is interposed which is heavy enough to resist the action of the blades, the improved clutching system serves to protect both blades and engine against development of destructive torque, while the clamping structure positively maintains the relative phase positions.

While the term "rubber" has been used for convenience in describing the washer 63, it will be understood that this term is intended, in a generic sense, to include artificial rubber and similar resilient materials commonly employed as rubber substitutes. The term "nut" is a general term covering any clamping element threadedly engaging the shaft. "Flange" refers to any shoulder secured to the shaft.

What is claimed is:

1. In an engine driven appliance, the combination of a shaft having a radial flange and an adjacent thread, a power driven element telescoped over the shaft, a nut engaging the thread, and a washer assembly telescoped over the shaft adjacent the power driven element, the washer assembly including a rubber washer, an adjacent Bellville washer and an auxiliary washer, the rubber washer being sandwiched between the Bellville washer and the auxiliary washer and the Bellville washer having its concave side faced toward the rubber washer so as to confine the rubber washer against the auxiliary washer while inhibiting radial expansion of the rubber washer as the nut is tightened, thereby to provide clutching force, the reaction of the confined rubber washer providing a sharply increasing spring rate as the nut is tightened thereby to prevent collapse of the Bellville washer upon severe tightening of the nut.

2. The combination as claimed in claim 1 in which the auxiliary washer lies immediately adjacent the power driven element for direct transmission of frictional torque thereto.

3. In a friction clutch, the combination of a shaft having a radial flange and an adjacent thread, a flat power driven element telescoped over the shaft adjacent the flange, a nut engaging the thread, and a washer assembly interposed between the nut and the power driven element, the washer assembly including (a) an auxiliary washer, (b) a rubber washer, (c) an adjacent Bellville washer having its concave side faced toward the rubber washer so as to confine the rubber washer against radial expansion as the nut is tightened, thereby to provide clutching force, and (d) a lock washer, the reaction of the confined rubber washer providing a sharply increasing spring rate as the nut is tightened thereby to prevent collapse of the Bellville washer upon severe tightening of the nut, the auxiliary washer and lock washer being keyed to the shaft.

4. In an engine driven appliance, the combination of a shaft having a radial flange and an adjacent thread, a power driven element telescoped over the shaft adjacent the flange, a nut engaging the thread, and a washer assembly interposed between the nut and the power driven element, the washer assembly including a rubber washer and an adjacent Bellville washer having its concave side faced toward the rubber washer so as to confine the rubber washer against radial expansion as to nut is tightened, thereby to provide clutching force, the washer assembly including a further washer on the opposite side of the rubber washer from the Bellville washer having an area substantially coextensive with the Bellville washer to insure area support of the rubber washer during confinement, the reaction of the confined rubber washer providing a sharply increasing spring rate as the nut is tightened thereby to prevent collapse of the Bellville washer upon severe tightening of the nut.

5. In an appliance having a rotatable drive shaft and a driven element, the combination of a radial flange secured to the drive shaft, a thread adjacent the radial flange, the driven element telescoped over the thread, and a washer assembly interposed between the nut and the radial flange, the washer assembly including a washer stationarily keyed to the shaft, a rubber washer, and an adjacent Bellville washer, the concave side of the Bellville washer facing the rubber washer so that the rubber washer is confined against the stationary washer to prevent collapse of the Bellville washer upon tightening of the nut the washer assembly being telescoped over the shaft and in axial force transmitting relation to the driven element so that upon tightening of the nut the driven element is frictionally coupled with the drive shaft with slippage therebetween when the torque required to drive the driven element exceeds the frictional torque.

6. The combination as claimed in claim 5 in which the driven element is a cutting blade and the washer assembly is interposed between the nut and the blade so that the stationary washer is in friction-transmitting relation with the blade.

7. In an engine driven appliance, the combination of a shaft having a radial flange and an adjacent thread, a power driven element telescoped over the shaft, a nut engaging the thread, and a washer assembly adjacent the power driven element, the washer assembly including in order (a) a flat washer, (b) a rubber washer and (c) an adjacent Bellville washer having its concave side faced toward the rubber washer so as to apply resilient axial force against the flat washer while confining the rubber washer against radial expansion as the nut is tightened, the flat washer being keyed to the shaft and engaging the driven element thereby to provide clutching force against the latter, the reaction of the confined rubber washer providing a sharply increasing spring rate as the nut is tightened thereby to prevent collapse of the Bellville washer upon severe tightening of the nut.

* * * * *